United States Patent
Sato

(10) Patent No.: US 9,041,945 B2
(45) Date of Patent: May 26, 2015

(54) SYSTEM, METHOD AND PROGRAM FOR CONTROLLING SETTING VALUES IN AN IMAGE FORMING APPARATUS

(71) Applicant: CANON KABUSHIKI KAISHA, Tokyo (JP)

(72) Inventor: Masaaki Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 124 days.

(21) Appl. No.: 13/727,257

(22) Filed: Dec. 26, 2012

(65) Prior Publication Data

US 2013/0163024 A1    Jun. 27, 2013

(30) Foreign Application Priority Data

Dec. 27, 2011    (JP) ................................. 2011-286087

(51) Int. Cl.
    *G06F 3/12*    (2006.01)
    *H04N 1/00*    (2006.01)
    *H04N 1/32*    (2006.01)

(52) U.S. Cl.
    CPC ....... *H04N 1/00076* (2013.01); *H04N 1/00408* (2013.01); *H04N 1/32122* (2013.01); *H04N 2201/0094* (2013.01); *H04N 2201/3219* (2013.01); *H04N 2201/3274* (2013.01); *H04N 2201/3202* (2013.01)

(58) Field of Classification Search
    None
    See application file for complete search history.

(56) References Cited

U.S. PATENT DOCUMENTS

| 7,656,548 B2 * | 2/2010 | Hagiwara | 358/1.15 |
| 2010/0238485 A1 * | 9/2010 | Miyamoto | 358/1.15 |
| 2011/0249290 A1 * | 10/2011 | Hayber et al. | 358/1.15 |

FOREIGN PATENT DOCUMENTS

| JP | 10-83263 A | 3/1998 |
| JP | 2004-287861 A | 10/2004 |
| JP | 2005-247773 A | 9/2005 |

* cited by examiner

*Primary Examiner* — Benny Q Tieu
*Assistant Examiner* — Sunil Chacko
(74) *Attorney, Agent, or Firm* — Canon USA Inc. IP Division

(57) ABSTRACT

An image forming apparatus and method includes executing a series of processes utilizing a plurality of functions based on a plurality of setting values, storing, as a history, an execution result of the processing, a plurality of setting values, and an error content in a case where the execution result is failure, determining whether the execution result of a previous processing is successful based on the stored in a case where the processing execution unit re-executes processing, specifying a setting value potentially causing the failure based on the error content in a case where the determination unit determines that the execution result of the previous processing is failure and performing display control of a setting field for setting the setting value.

7 Claims, 20 Drawing Sheets

FIG.4

| APPLICATION (Job Type) | ERROR CASE | CAUSE PLACE (Step) | CAUSE PLACE (Item type) |
|---|---|---|---|
| FaxSend | SENDING ERROR | FaxNumber | number |
| FaxSend | ACCESS CONCENTRATION | NOT AVAILABLE | NOT AVAILABLE |
| SendToServer | AUTHENTICATION ERROR | Login | userid password domain |
| SendToServer | ERROR BY WHICH SERVER NAME CANNOT BE SOLVED | ServerInfo | DomainNameServer |

FIG.5

| No | PROCESS DEFINITION FILE NAME | Job Type | Step | Item type | SETTING VALUE | EXECUTION RESULT | ERROR CASE |
|---|---|---|---|---|---|---|---|
| 1 | RESERVE FAX SENDING | FaxSend | FaxNumber | number | 123546789 | FAILURE | SENDING ERROR |
|   |   |   | ReserveTime | time | 00:00 |   |   |
| 2 | RESERVE FAX SENDING | FaxSend | FaxNumber | number | 123546789 | FAILURE | ACCESS CONCENTRATION |
|   |   |   | ReserveTime | time | 00:00 |   |   |
| 3 | SEND TO SERVER FOLDER | SendToServer | Login | userid | AAA | FAILURE | AUTHENTICATION ERROR |
|   |   |   |   | password | **** |   |   |
|   |   |   |   | domain | xxx.com |   |   |
|   |   |   | Server | servername | ¥¥ServerA.xxx.com |   |   |
|   |   |   | (Hidden)ServerInfo | DomainNameServer | xxx.yyy.ppp |   |   |
| 4 | SEND TO SERVER FOLDER | SendToServer | Login | userid | AAA | FAILURE | ERROR BY WHICH SERVER NAME CANNOT BE SOLVED |
|   |   |   |   | password | **** |   |   |
|   |   |   |   | domain | xxx.com |   |   |
|   |   |   | Server | servername | ¥¥ServerA.xxx.com |   |   |

510 PROCESS DEFINITION FILE

```
<?xml version="1.0" encoding="UTF-8"?>
601 — <Process id="510" type="Send" name="RESERVE FAX SENDING">
602 —   <Workflow>
603 —     <Job type="Scan">
              <Item type="number">000123456789</Item>
              <Item type="color">black and white</Item>
          </Job>

604 —     <Job type="FaxSend">
605 —        <Item type="Step">FaxNumber</Item>
              <Item type="number">000123456789</Item>
606 —        <Item type="Step">ReserveTime</Item>
              <Item type="time">00:00</Item>

607 —        <Item type="Step">ExecuteSend</Item>
              <Item type="background">fax</Item>
          </Job>
        </Workflow>
      </Process>
```

FIG.9B

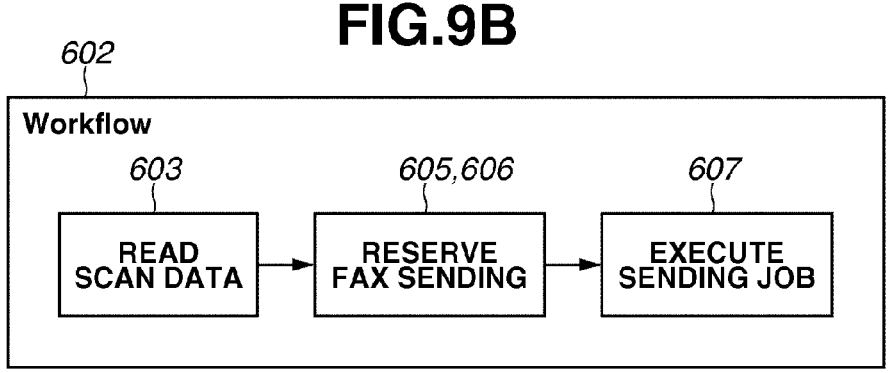

FIG.11

FaxNumber

PREVIOUS EXECUTION RESULT → SENDING FAILURE
(DESIGNATED NUMBER CANNOT BE ATTAINED)
CAUSE SETTING VALUE number → 00123456789 number [          ]

| CANCEL | RETURN | NEXT |

FIG.14A

```
                                                    1310  PROCESS
                                                          DEFINITION FILE
       <?xml version="1.0" encoding="UTF-8"?>
601    <Process id="1310" type="Send" name="SEND TO SERVER FOLDER">
602      <Workflow>
603        <Job type="Scan">
                  <Item type="number">000123456789</Item>
                  <Item type="color">black and white</Item>
           </Job>

1401       <Job type="SendToServer">
1402         <Item type="Step" info="hidden">ServerInfo</Item>
                  <Item type="DomainNameServer">xxx.yyy.ppp</Item>
1403         <Item type="Step">Login</Item>
                  <Item type="userid">AAA</Item>
                  <Item type="password"></Item>
                  <Item type="domain">xxx.com</Item>
1404         <Item type="Step">Server</Item>
                  <Item type="servername">\\ServerA.xxx.com\folder</Item>
                  <Item type="foldername">\shareFolder\folder</Item>

1405         <Item type="Step">ExecuteSend</Item>
                  <Item type="background">ServerSend</Item>
           </Job>
         </Workflow>
       </Process>
```

FIG.15

Login

PREVIOUS EXECUTION RESULT → SENDING ERROR
PREVIOUS SETTING VALUE
USER NAME → AAA
PASSWORD → ****
DOMAIN NAME → xxx.com

| | |
|---|---|
| userid | AAA |
| password | **** |
| domain | xxx.com |

| CANCEL | RETURN | NEXT |

SYSTEM, METHOD AND PROGRAM FOR CONTROLLING SETTING VALUES IN AN IMAGE FORMING APPARATUS

BACKGROUND OF THE INVENTION

1. Field of the Invention

Aspects of the present invention generally relate to an image forming apparatus, an information processing method, and a program.

2. Description of the Related Art

A multifunction peripheral is conventionally discussed, which is obtained by integrating a copying machine with facsimile, scanner, and printer functions. The multifunction peripheral can associate business processing based on a paper subject using the copying machine and a facsimile with processing of a document computerized on a personal computer. More specifically, the multifunction peripheral can scan a paper document and send data of the paper document to the personal computer and send a document received by the facsimile to the personal computer with image data as it is without printing the document. In addition, many procedures and processing after the paper document and the facsimile received document are computerized are expected to be associated with each other and automatically preformed.

Such a multifunction peripheral is expected to cooperatively perform various functions and executes a plurality of operations and processes as a series of processing flows. For example, an image forming apparatus is discussed which can store a plurality of output setting data pieces (process definition files) for setting an output form, form an image in the output form according to the selected output setting data, and output the image (see Japanese Patent Application Laid-Open No. 10-83263). An image forming apparatus is discussed which can perform settings of sending to a facsimile or to a personal computer connected to a network, a setting of a scanner, and a setting of association of processing, and associate a plurality of types of processing with each other (see Japanese Patent Application Laid-Open No. 2004-287861).

In the process definition files for performing sending to the facsimile or to the personal computer connected to the network, a number of a connection destination, a path of a sending storage destination, authenticated user information, and a file name are set in advance. By previously setting information in the process definition file, the labor of input when a user executes the process definition file may be omitted, and the user convenience can be increased.

Because the sending processing of an image to the facsimile machine or to the personal computer connected to the network is influenced by network traffic, and possibly requires much time, it is general that the sending processing of the image is asynchronously performed in a background. Therefore, an image forming apparatus manages a sending processing result of the background as a sending history and provides a function for confirming the sending history to allow a user to confirm the sending result (see Japanese Patent Application No. 2005-247773).

However, when a mistaken setting value is stored in the process definition file, or authentication information of the personal computer of the sending storage destination is changed, the sending in the background is executed with the mistaken setting value as it is. In such a case, as long as the setting value is not confirmed by the function for confirming the sending history, the processing is repeatedly executed using the setting value during the previous execution without being noticed, and the failure may be repeated. At the same time, it is difficult to easily specify the cause of the failure.

SUMMARY OF THE INVENTION

An aspect of the present invention relates to a technique capable of specifying and correcting a setting value causing failure without repeating the failure.

According to an aspect of the present invention, an image forming apparatus having a plurality of functions includes a processing execution unit configured to execute a series of processes utilizing the plurality of functions based on a plurality of setting values, a history storage unit configured to store, as a history, an execution result of the processing by the processing execution unit, the plurality of setting values, and an error content in a case where the execution result is failure, a determination unit configured to determine whether the execution result of a previous processing is successful based on the stored history in a case where the processing execution unit re-executes the processing, and a display control unit configured to specify a setting value potentially causing failure based on the error content in a case where the determination unit determines that the execution result of the previous processing is failure and to perform display control of a setting field for setting the setting value.

According to an exemplary embodiment, a setting value causing failure can be specified and corrected without repeating the failure.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates an example of a table managed by an error generation cause management unit.

FIG. 5 illustrates an example of a table managed by a job execution history management unit.

FIG. 11 illustrates an example of a screen to be provided as an input unit for a setting value.

FIG. 14A illustrates a specific description example of a process definition file sent to the MFP.

FIG. 15 illustrates an example of a screen to be provided as an input unit for a setting value.

DESCRIPTION OF THE EMBODIMENTS

Various exemplary embodiments, features, and aspects of the invention will be described in detail below with reference to the drawings.

Figure 1:
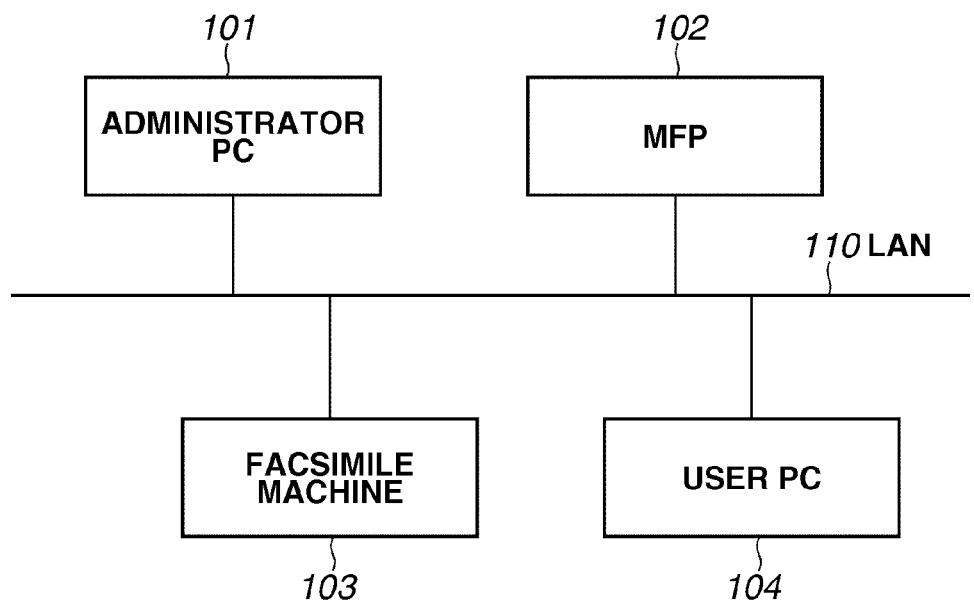
FIG. 1 illustrates an example of a system configuration of an image processing system according to a first exemplary embodiment.

FIG. 1 illustrates an example of a system configuration of an image processing system according to a first exemplary embodiment. An administrator PC 101, a multifunction peripheral (MFP) 102, a facsimile machine 103, and a user PC 104 are interconnected by a local area network (LAN) 110 such that they can communicate with each other. The MFP 102 is an example of an image forming apparatus.

Figure 2:
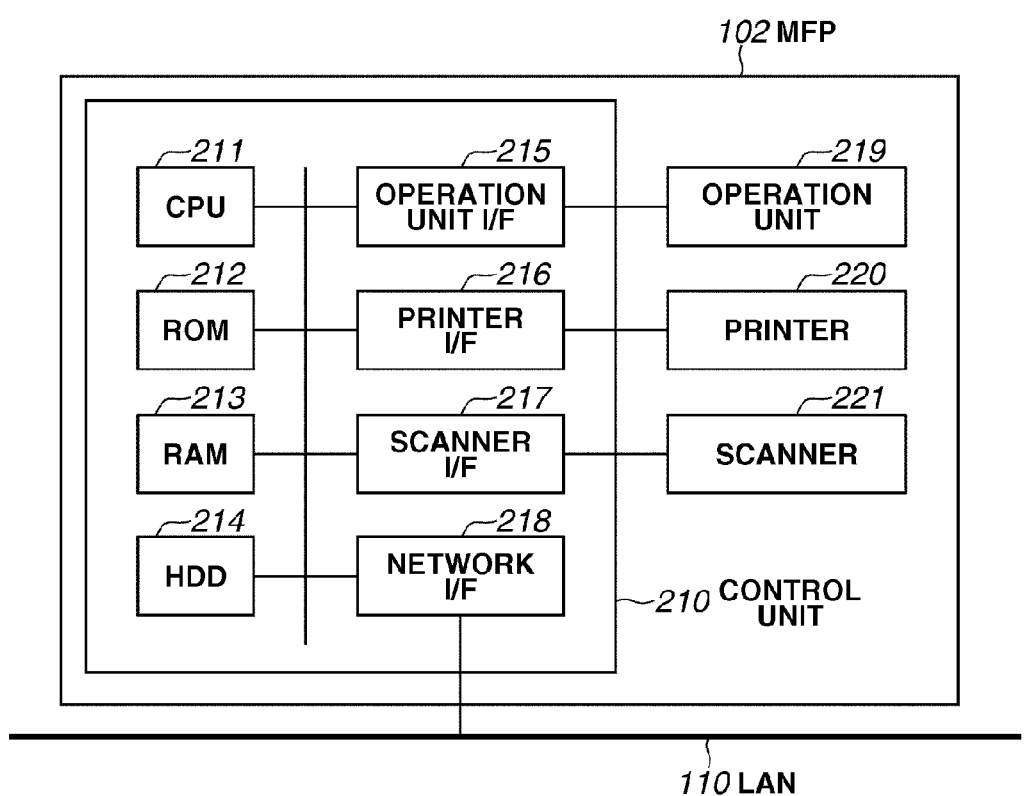
FIG. 2 illustrates an example of a hardware configuration of a multifunction peripheral (MFP).

FIG. 2 illustrates an example of a hardware configuration of the MFP 102. A control unit 210 includes a central processing unit (CPU) 211 and entirely controls operations of the MFP 102. The CPU 211 reads a control program stored in a read-only memory (ROM) 212 to execute various types of control processing such as reading control and sending control. A random access memory (RAM) 213 is used as a main memory of the CPU 211 and as a temporary storage area such as a work area. A hard disk drive (HDD) 214 stores image data or various programs.

An operation unit interface (I/F) 215 connects an operation unit 219 with the control unit 210. The operation unit 219 includes a liquid crystal display unit having a touch panel function, a keyboard, and the like. A printer I/F 216 connects a printer 220 with the control unit 210. The control unit 210 transfers image data to be printed by the printer 220 via the printer I/F 216, and the printer 220 prints the image data on a recording medium.

A scanner I/F 217 connects a scanner 221 with the control unit 210. The scanner 221 reads an image on a document to generate image data, and inputs the image data to the control unit 210 via the scanner I/F 217. A network I/F 218 connects the control unit 210 (MFP 102) with the LAN 110. The network I/F 218 sends the image data to an external apparatus (for example, the facsimile machine 103 and the user PC 104) on the LAN 110. A table to be described below is stored in, for example, the HDD 214.

Figure 3:
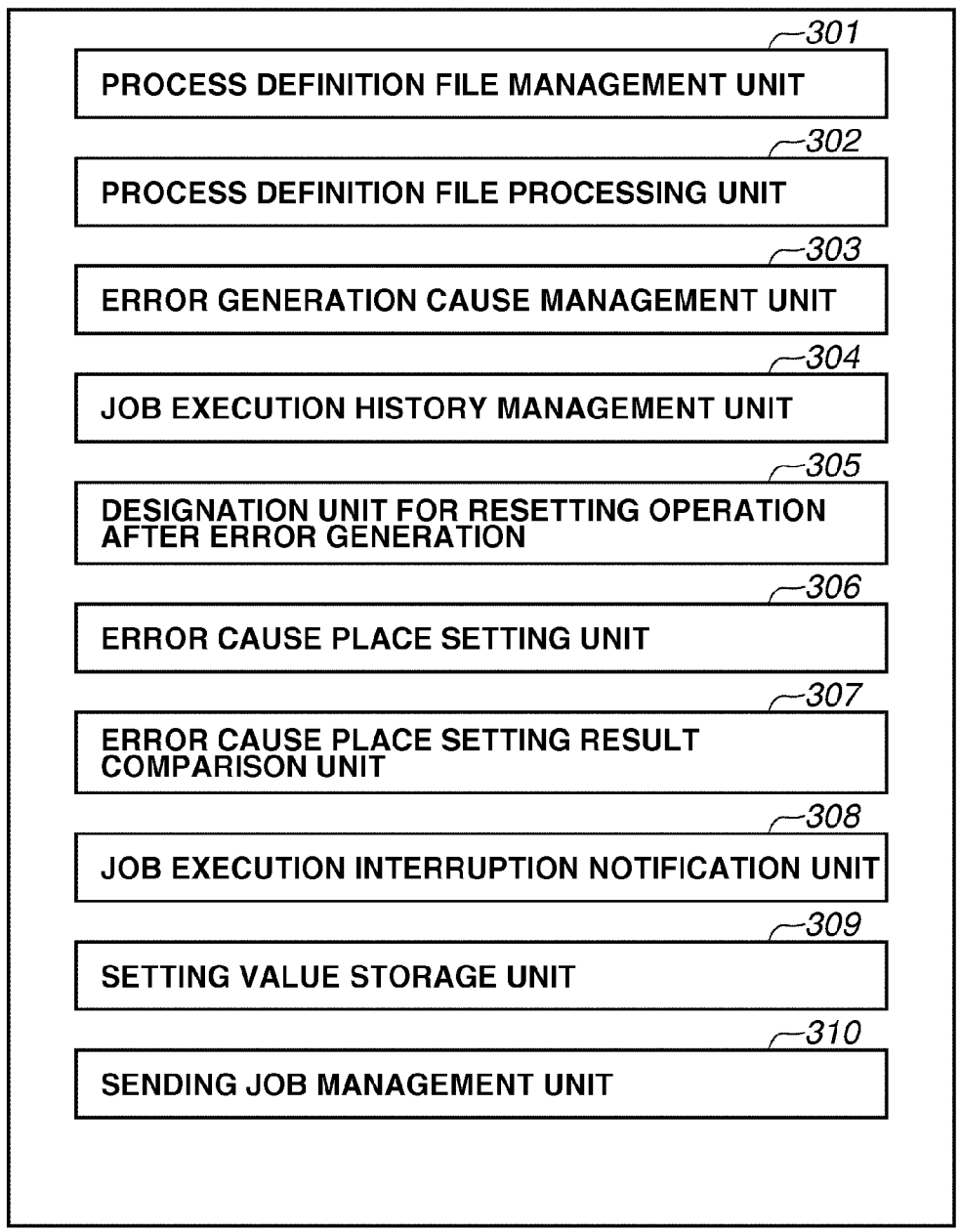
FIG. 3 illustrates an example of a software configuration achieved when a central processing unit (CPU) executes each control program stored in a read only memory (ROM) of the MFP.

FIG. 3 illustrates an example of a software configuration achieved when the CPU 211 executes each control program stored in the ROM 212 of the MFP 102. A process definition file management unit 301 manages a process definition file received from the administrator PC 101, and a plurality of process definition files created by the MFP 102.

A process definition file processing unit 302 executes processing related to the process definition file (processing execution). More specifically, the process definition file processing unit 302 acquires the process definition files managed by the process definition file management unit 301, and displays the process definition files in a list. Then, a user designates a specific process definition file from the process definition files displayed in the list, and instructs execution of the process definition file. The process definition file processing unit 302 executes the specific process definition file based on the instruction. In addition, the process definition file processing unit 302 newly creates and edits the process definition file based on the instruction from the user.

An error generation cause management unit 303 manages information about a parameter of a setting place which is a cause corresponding to a generated error case for every application. FIG. 4 illustrates an example of a table managed by the error generation cause management unit 303.

A job execution history management unit 304 stores and manages an execution history of the process definition file executed in the process definition file processing unit 302 (history storage). FIG. 5 illustrates an example of a table (hereinafter, referred to as a table 800) managed by the job execution history management unit 304.

A designating unit 305 for resetting operation after error generation designates an operation for providing a value of a setting object in the process definition file at the time of resetting in a state where the value is null or in a state where a value set in the process definition file is set.

An error cause place setting unit 306 is a setting unit for inputting a setting value into the specified error cause place. An input unit provides the setting value according to the operation designation by the designating unit 305 for resetting operation after error generation. The error cause place setting unit 306 also provides information about a previous execution result, a cause setting place, and the setting value, together with error information.

An error cause place setting result comparison unit 307 returns a comparison result of the setting value set by the error cause place setting unit 306 and the setting value set in the specified process definition file. A job execution interruption notification unit 308 notifies the process definition file processing unit 302 of execution interruption of processing of the specified process definition file. A setting value storage unit 309 rewrites and stores the process definition file specified by the input value.

A sending job management unit 310 asynchronously sends in a background a sending job input from the process definition file processing unit 302. The sending job management unit 310 delivers a sending result of the sending job input from the process definition file to the job execution history management unit 304. The sending job management unit 310 provides a function for asynchronously confirming a list of the sending results of the sending job via the operation unit I/F 215.

Figure 6:
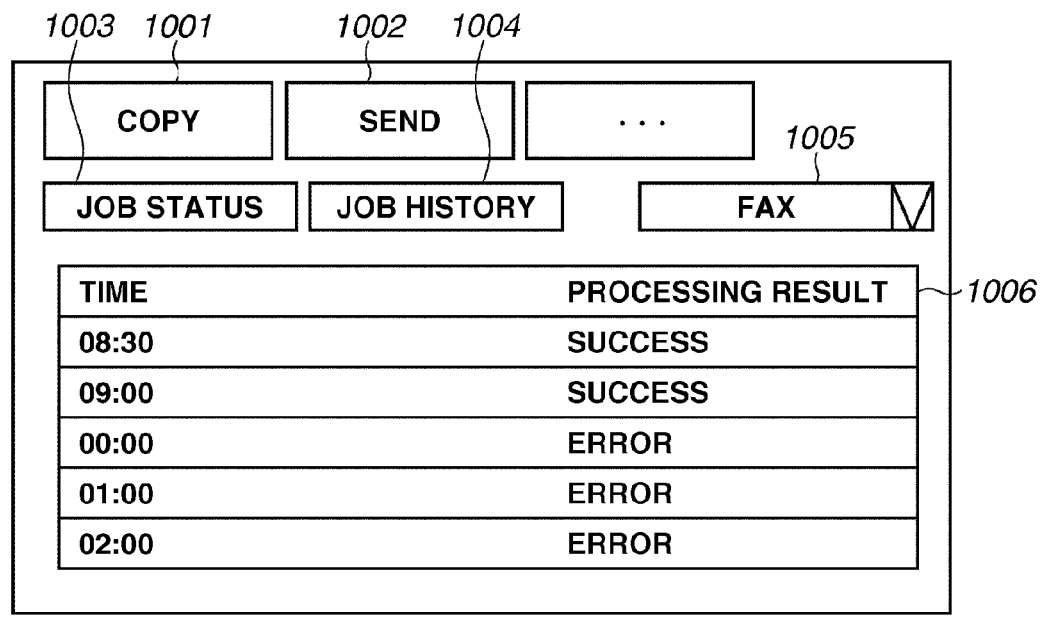
FIG. 6 illustrates an example of display of a list for sending results.

FIG. 6 illustrates an example of display of the list of the sending results. The user can narrow down the list of the sending results for every type of function of copy (1001) or sending (1002). The sending function includes sending to a facsimile (1005) or to the user PC 104, and mail sending. The function can be narrowed down. The user can narrow down a sending job result using information (1003) about a presently operating job or a job history (1004) of which an operation is completed. A list (1006) of the sending results is a list of results obtained by designating the sending (1002) and the job history (1004) of the facsimile (1005). The example in FIG. 6 illustrates a state that the sending job is repeatedly input without noticing that an error occurs from the time point of 00:00 in the list display, and the sending job of the error result is input.

The facsimile machine 103 includes the similar configuration to that of the MFP 102. However, in the present exemplary embodiment, the facsimile machine 103 is distinguished as a facsimile sending destination.

Figure 7:
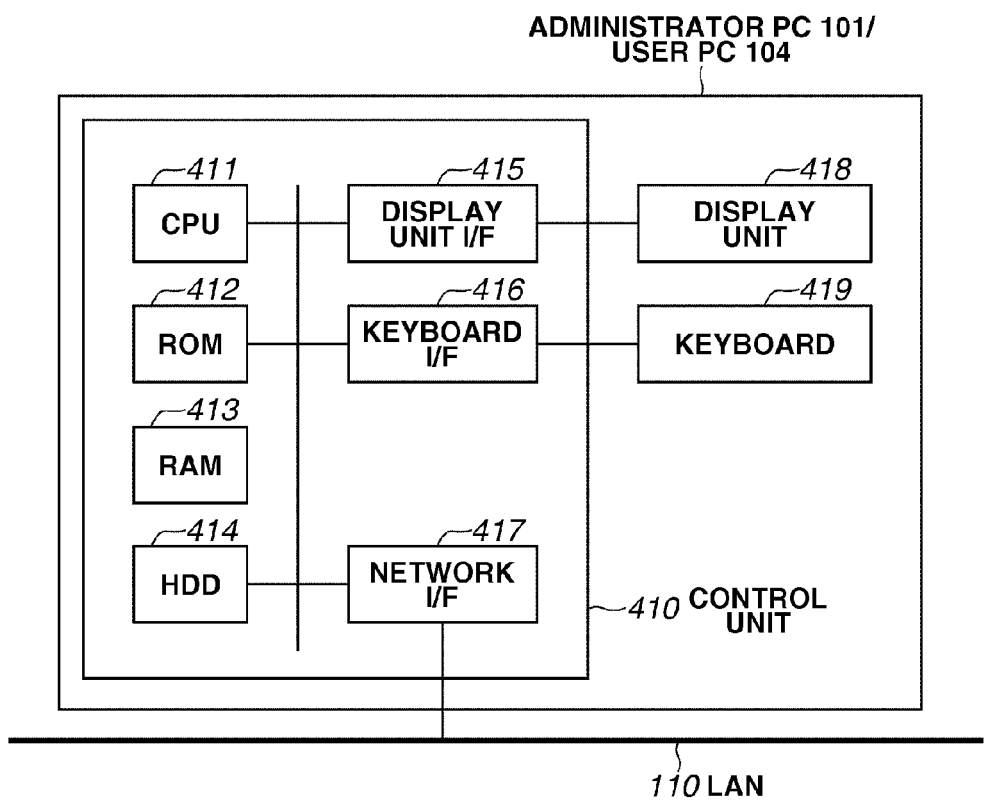
FIG. 7 illustrates an example of a hardware configuration of an administrator personal computer (PC).

FIG. 7 illustrates an example of a hardware configuration of the administrator PC 101. Since the user PC 104 includes the similar configuration to that of the administrator PC 101, the user PC 104 is described together herein. A control unit 410 includes a CPU 411 and entirely controls the operation of the administrator PC 101. The CPU 411 reads a control program stored in a ROM 412 to execute various types of control processing. A RAM 413 is used as a main memory of the CPU 411 and as a temporary storage area such as a work area. A HDD 414 stores image data, various programs, or various information tables to be described below.

A display unit I/F 415 connects a display unit 418 and the control unit 410. A keyboard I/F 416 connects a keyboard 419 and the control unit 410. The CPU 411 recognizes an instruction from the user input via the keyboard 419, and change a screen to be displayed on the display unit 418 based on the recognized instruction. A network I/F 417 connects the control unit 410 (administrator PC 101) to the LAN 110. The network I/F 417 sends and receives various information pieces to and from other apparatuses on the LAN 110.

Figure 8:
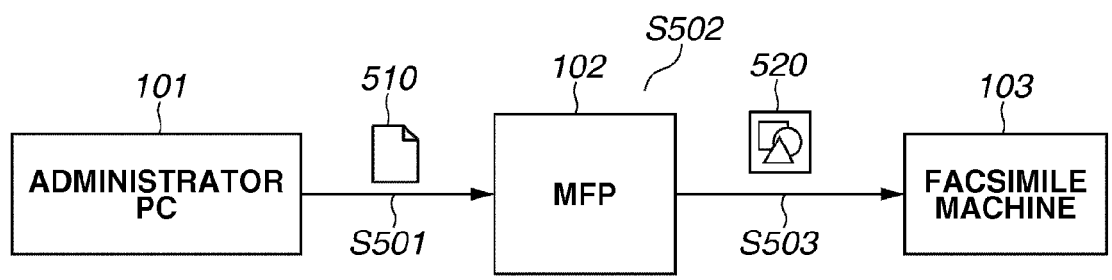
FIG. 8 illustrates an example of an overall operation of the image processing system according to the first exemplary embodiment.

Next, the overall operation of the image processing system will be conceptually described with reference to FIG. 8. FIG. 8 illustrates an example of the overall operation of the image processing system according to the first exemplary embodiment. First, a user operates the administrator PC 101 to create a process definition file 510. Definitions for executing a series of processes utilizing a plurality of functions included in the MFP 102 are described in the process definition file 510. According to the present exemplary embodiment, a series of processes for sending a facsimile of image data read by the scanner are defined in the process definition file 510.

The user inputs various processing contents (a document scan parameter, a print setting, and so on) via a process definition file creation screen displayed on the administrator PC 101. When the creation of the process definition file is completed, in step S501, the created process definition file 510 is sent to the MFP 102 from the administrator PC 101 via the LAN 110.

The user instructs execution of the process definition file 510 in the MFP 102. Thus, in step S502, the MFP 102 starts processing according to the process definition file 510. Then, in step S503, the user operates the MFP 102 according to the processing of the process definition file 510 to send image data 520 scanned by the MFP 102 to the facsimile machine 103 via the LAN 110.

Figure 9:
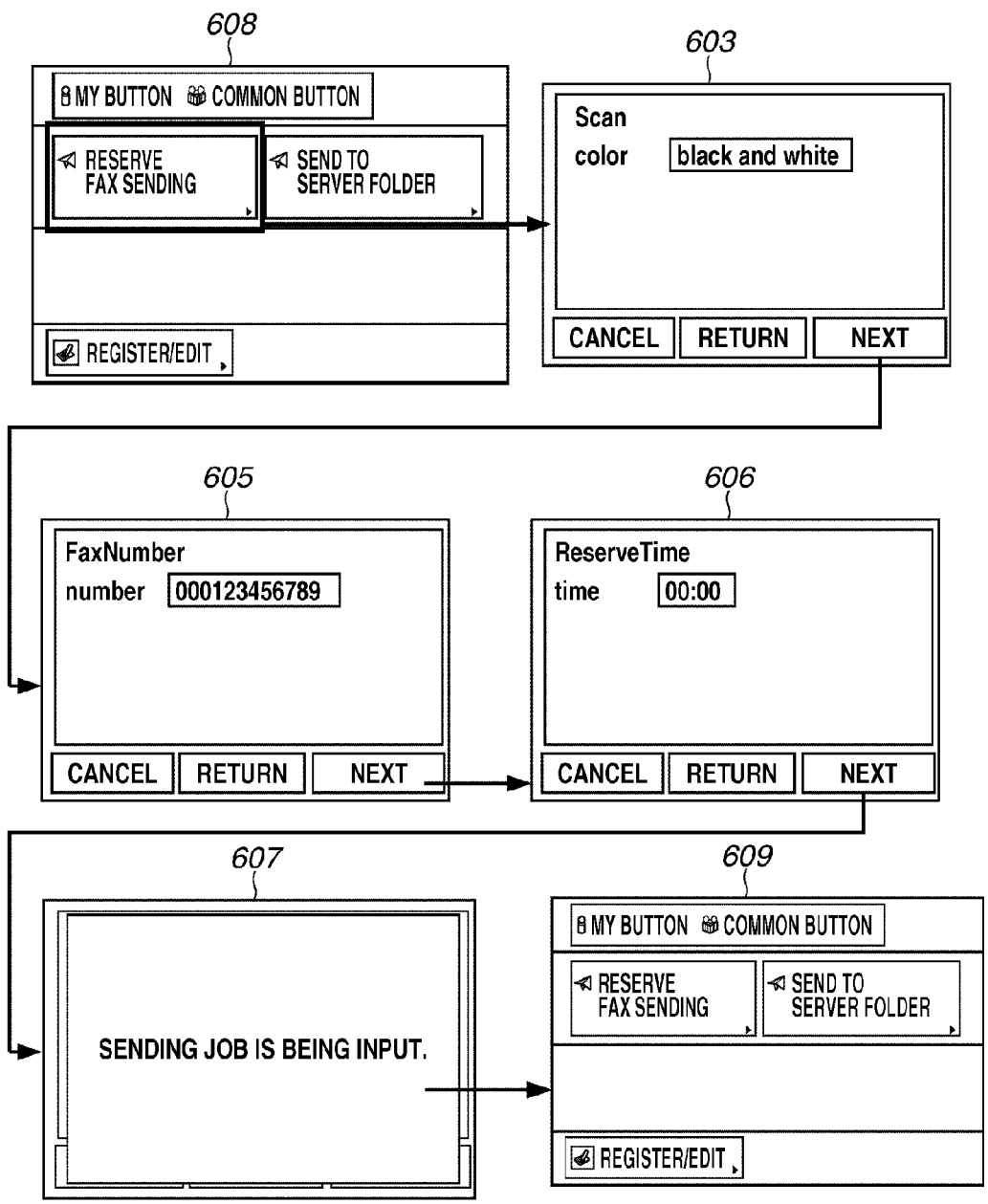
FIG. 9A illustrates a specific description example of a process definition file sent to the MFP.
FIG. 9B conceptually represents processing defined by a Workflow tag of the process definition file illustrated in FIG. 9A.
FIG. 9C illustrates an example of a screen displayed to a user on an operation unit when the processing defined by the Workflow tag of the process definition file illustrated in FIG. 9A is executed.

FIG. 9A illustrates a specific description example of the process definition file 510 sent to the MFP 102. The example in FIG. 9A is described in Extensible Markup Language (XML) format, however the process definition file may be described in other formats.

A tag 601 (Process tag) defines the fact that this file is a process definition file. The respective items relating to the process definition file are described as subelements of the Process tag 601. A process id (501) uniquely identifying the process definition file, a type (Send) associated with sending, and the name of the process (RESERVE FAX SENDING) are defined as attributes of the Process tag 601. A tag 602 (Workflow tag) defines each processing executed by the process definition file. Each processing is described as a subelement of the Workflow tag 602, and the order of appearance in the process definition file indicates the execution order of the processing. A tag 603 defines processing for reading scan data as input. The subelement of the tag 603 defines color designation (black and white) of the actually read scan data.

A tag 604 defines processing for facsimile sending the image data. The subelement of the tag 604 divides processing to be input by a user by a type (Step), and is divided with a tag 605, a tag 606, and a tag 607. The tag 605 designates a facsimile number, and the subelement defines a facsimile number (number). The tag 606 designates a reservation time, and the subelement defines time (time). The tag 607 designates inputting of a sending job, and the subelement defines facsimile sending by a background (background).

FIG. 9B conceptually represents the processing defined by the Workflow tag 602 of the process definition file 510 illustrated in FIG. 9A. The Workflow tag 602 defines a series of processes of reading the scan data (tag 603), reserving facsimile sending (tag 605 and tag 606), and executing the sending job (tag 607).

FIG. 9C illustrates an example of a screen displayed to the user on the operation unit 219 when the processing defined by the Workflow tag of the process definition file 510 illustrated in FIG. 9A is executed. Top menus 608 and 609 are used for list selection of the process definition file managed by the process definition file processing unit 302. The user can designate the execution of the specific process definition file in the top menu. The user presses "reserve fax sending" in the top menu 608 to start the execution of the appropriate process definition file. When the execution is started, the MFP 102 sequentially executes processing based on a setting value related to the scan data reading (tag 603), a setting value related to the FaxNumber (tag 605), and a setting value related to the ReserveTime (tag 606). When the user presses "NEXT" of the step (tag 606) before inputting the sending job, the MFP 102 executes ExecuteSend (tag 607). When the sending job management unit 310 completes the inputting of the sending job, the top menu 609 is displayed.

Figure 10:
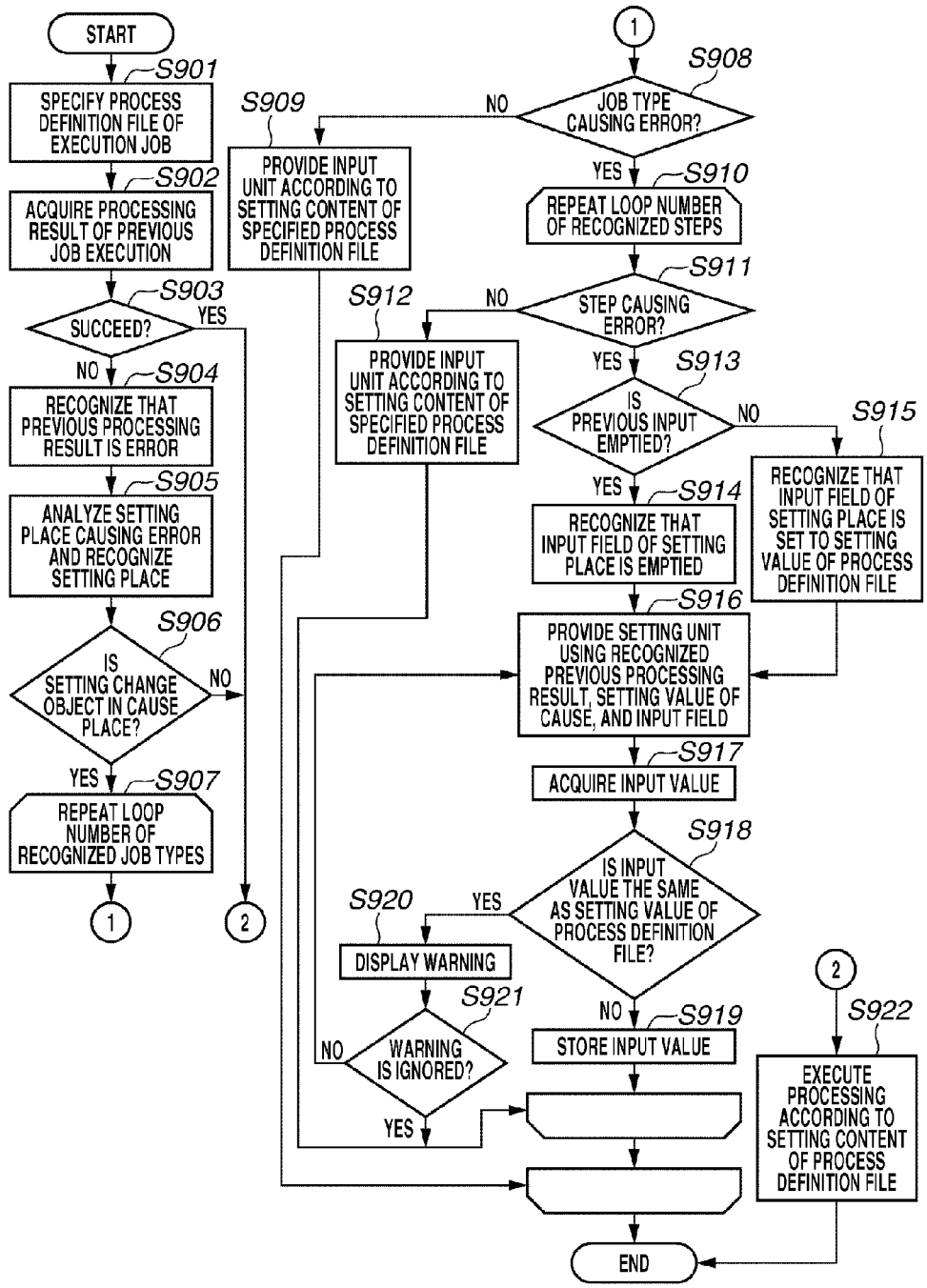
FIG. 10 is a flow chart illustrating an example of information processing for specifying an error generation cause and rewriting a process definition file with an input value.

Processing for specifying an error generation cause of the MFP 102 and rewriting the process definition file to the input value according to the present exemplary embodiment will be described below referring to a flow chart in FIG. 10. FIG. 10 is a flow chart illustrating an example of information processing for specifying the error generation cause and rewriting the process definition file to the input value.

In step S901, the process definition file processing unit 302 reads the process definition file managed by the process definition file management unit 301 to the RAM. 213 from the HDD 214. An object to be read by the process definition file processing unit 302 at this time is a process definition file in which execution of processing is designated by a user operation.

Next, in step S902, the process definition file processing unit 302 acquires a name defined by the Process tag of the process definition file read in step S901. In step S902, the process definition file processing unit 302 acquires a previous job execution processing result managed by the job execution history management unit 304, and acquires a job execution processing result matching with a process definition file name specified by the name.

In step S903, the process definition file processing unit 302 determines the processing result acquired in step S902. When the processing result is successful (YES in step S903), the process definition file processing unit 302 advances the processing to step S922 described below. When the processing result is failure (NO in step S903), the process definition file processing unit 302 advances the processing to step S904.

In step S904, the process definition file processing unit 302 recognizes that the previous processing result is an error and content of the error (more specifically, information managed by the table 800 of the job execution history management unit 304).

In step S905, the process definition file processing unit 302 acquires information of an error generation cause place managed by the error generation cause management unit 303. The process definition file processing unit 302 specifies that a Job Type and a cause place (Step) of the acquired information matches with a Job Type and Step of the error content acquired in step S904 to recognize a setting place causing the error in the previous processing.

In step S906, the process definition file processing unit 302 determines whether a parameter of a setting change object exists in the setting place recognized in step S905. When the object exists (YES in step S906), the process definition file processing unit 302 advances the processing to step S913. When the object does not exist (NO in step S906), the process definition file processing unit 302 advances the processing to step S922 described below.

In step S907, the process definition file processing unit 302 repeats the processing for the number of Job Types of the recognized process definition file.

In step S908, the process definition file processing unit 302 determines whether the Job Type of the specified process definition file matches with the Job Type of the error content recognized in step S904. If the Job Types do not match with each other (NO in step S908), the process definition file processing unit 302 advances the processing to step S909. Whereas if the Job Types match with each other (YES in step S908), the process definition file processing unit 302 advances the processing to step S910.

In the step S909, the process definition file processing unit 302 provides an input unit for setting the setting value according to the setting content of the Job Type of the specified process definition file.

In step S910, the process definition file processing unit 302 repeats the processing for the number of Steps in the subelement of the Job Type of the recognized process definition file.

In step S911, the process definition file processing unit 302 determines whether Step of the specified process definition file matches with Step of the error content recognized in step S904. If the Steps do not match with each other (NO in step S911), the process definition file processing unit 302 advances the processing to step S912. Whereas if the Steps match with each other (YES in step S911), the process definition file processing unit 302 advances the processing to step S913.

In step S912, the process definition file processing unit 302 provides an input unit for setting the setting value according to the setting content of the Job Type and the Step of the specified process definition file.

In step S913, the process definition file processing unit 302 acquires the setting value of the operation designation from the designating unit 305 for resetting operation after error generation. If the designation empties the previous input (YES in step S913), the process definition file processing unit 302 advances the processing to step S914. If the designation does not empty the previous input (NO in step S913), the process definition file processing unit 302 advances the processing to step S915.

In step S914, the process definition file processing unit 302 recognizes that an input field (or setting field) of the setting place of the error cause is emptied.

In step S915, the process definition file processing unit 302 recognizes that an input unit is provided with use of the setting value set in the process definition file specifying the input field of the setting place of the error cause.

In step S916, the process definition file processing unit 302 designates the use of the setting content recognized in steps S904, S905, S914, or S915, and calls the error cause place setting unit 306. The error cause place setting unit 306 provides (or controls display) an input unit for setting the setting value of the setting place of the error cause as the designated content. Thus, the user can input the setting value.

In step S917, the process definition file processing unit 302 acquires the value input by the error cause place setting unit 306.

In step S918, the process definition file processing unit 302 calls the error cause place setting result comparison unit 307. If the value input in step S917 is the same as the setting value of the process definition file (YES in step S918), the process definition file processing unit 302 advances the processing to step S920. If the input value is different from the setting value (NO in step S918), the process definition file processing unit 302 advances the processing to step S919.

In step S919, the process definition file processing unit 302 calls the setting value storage unit 309, and rewrites and stores the setting place of the error cause of the process definition file specified by the value set in step S917.

In step S920, the process definition file processing unit 302 calls the job execution interruption notification unit 308, and interrupts the job being executed by the specified process definition file being executed. The job execution interruption notification unit 308 displays warning for prompting the user to re-input, and then advances the processing to step S921.

In step S921, the process definition file processing unit 302 determines whether the user makes designation by ignoring the warning. If the user makes the designation without ignoring the warning (NO in step S921), the process definition file processing unit 302 advances the processing to step S916. If the warning is ignored (YES in step S921), the process definition file processing unit 302 advances the processing to step S912.

In step S922, the process definition file processing unit 302 sequentially executes processing using the setting content of the recognized process definition file.

Hereinbelow, there will be described application examples of the present exemplary embodiment when a previous processing result obtained by executing the process definition file of the "reserve fax sending" is an error, and the user executes the process definition file of the "reserve fax sending". In the use case described below, it is assumed that a null value input unit is provided to the designating unit 305 for resetting operation after error generation when the process definition file is reset.

<Error Case 1>: A case where a previous processing result managed by the job execution history management unit 304 is No. 1 of the table 800

In step S901, the process definition file processing unit 302 recognizes the execution of the process definition file "reserve fax sending". In step S902, the process definition file processing unit 302 acquires all the information pieces of items corresponding to No. 1 of the table 800 in FIG. 5, and advances the processing to step S903. In step S903, the process definition file processing unit 302 determines that the execution result is "failure" (NO in step S903), and advances the processing to step S904.

In step S904, the process definition file processing unit 302 recognizes that the previous processing result is failure. In step S905, the process definition file processing unit 302 specifies a cause place where the Job Type recognized in step S904 matches with the error case from the information of the generation cause place acquired from the error generation cause management unit 303. As a result of specifying the cause place, the process definition file processing unit 302 recognizes that the cause place is an Item type (number).

In step S906, the process definition file processing unit 302 determines that a parameter for a changing object exists (YES in step S906), and advances the processing to step S907. In step S907, the process definition file processing unit 302 starts repeating the loop for the number of the Job Types, and performs processing in the order of the Job Type described in the process definition file of the "reserve fax sending".

In step S908, if the Job Type is scan, the Job Type is different from the Job Type (FaxSend) recognized in step S905. Thus, the process definition file processing unit 302 advances the processing to step S909. The process definition file processing unit 302 displays a screen 603 in FIG. 9C as the input unit. When the user presses OK, the processing proceeds to loop S907 and the processing is sequentially continued. In step S908, the process definition file processing unit 302 recognizes a Job Type (FaxNumber) described in the process definition file of the "reserve fax sending". The process definition file processing unit 302 determines that the Job Type matches with the Job Type (FaxSend) recognized in step S904, and advances the processing to step S910.

In step S910, the process definition file processing unit 302 starts repeating the loop for the number of Steps, and performs processing in the order of Step described in the process definition file of the "reserve fax sending".

In step S911, the process definition file processing unit 302 recognizes Step (FaxNumber) described in the process definition file of the "reserve fax sending". The process definition file processing unit 302 determines that the Step matches with the Step (FaxNumber) recognized in step S904, and advances the processing to step S913. In step S913, the process definition file processing unit 302 determines that the input field for setting is to be emptied (YES in step S913), and advances the processing to steps S914 and S916.

In step S916, the process definition file processing unit 302 calls the error cause place setting unit 306. FIG. 11 illustrates an example of a screen provided as the input unit for the setting value. With respect to the Step (FaxNumber) in which the error is generated, since the recognized previous processing result, the setting value of the cause, and a field for inputting the setting value in an empty state are provided, an effect of prompting the user to perform resetting may be obtained. More specifically, the error cause place setting unit 306 displays a screen including the input field for inputting the setting value. The error cause place setting unit 306 displays the screen with the input field being in an empty state. Further, the error cause place setting unit 306 displays the previous processing result and the setting value of the cause near the input field. Herein, "near the input field" is, for example, an area within a predetermined range from the input field in the screen.

In step S917, the process definition file processing unit 302 acquires a value input into the input field (number).

Figure 12:
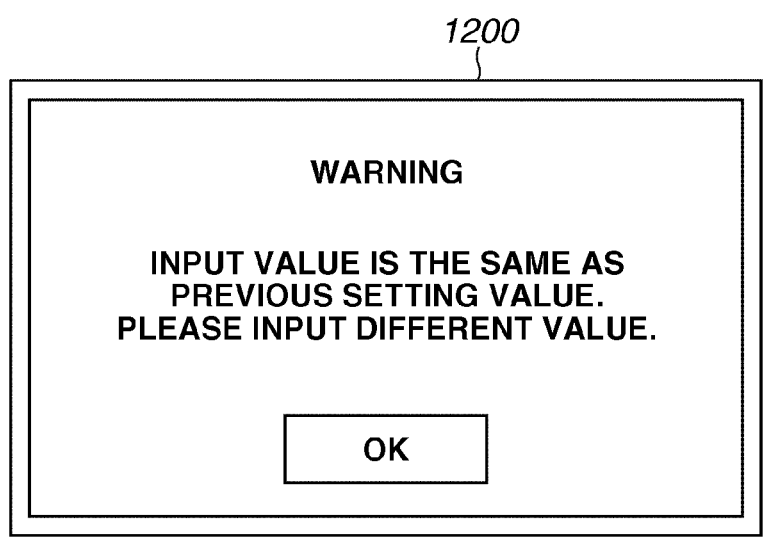
FIG. 12 illustrates an example of a warning screen.

In step S918, the process definition file processing unit 302 calls the error cause place setting result comparison unit 307. The error cause place setting result comparison unit 307 compares the value input into the input field (number) with the setting value stored in the process definition file, and checks whether the input setting value is changed. If the input value is changed (NO in step S918), the process definition file processing unit 302 advances the processing to step S919. If the input value is the same and is not changed (YES in step S918), the process definition file processing unit 302 advances the processing to step S920, and displays warning. FIG. 12 illustrates an example of a warning screen 1200.

In step S919, the process definition file processing unit 302 calls the setting value storage unit 309, rewrites the setting place of the error cause in the process definition file specified by the value set in step S917, and changes the setting value of the error cause.

In step S921, the process definition file processing unit 302 determines that the warning is not ignored when the user presses "return" in step S920 (NO in step S921), and advances the processing to step S916.

Next, because the two remaining steps associated with the Job Type (FaxNumber) exist, the loop processing of step S910 is continued. In step S911, the process definition file processing unit 302 recognizes Step (ReserveTime) described in the process definition file of the "reserve fax sending". In step S911, the process definition file processing unit 302 determines that the Step is different from the Step (FaxNumber) recognized in step S904, and advances the processing to step S912. The process definition file processing unit 302 displays a screen 606 in FIG. 9C as the input unit. When the user presses OK, the processing proceeds to loop S907 and the processing is sequentially continued.

Then, the loop processing of step S910 is continued. In step S911, the process definition file processing unit 302 recognizes Step (ExecuteSend) described in the process definition file of the "reserve fax sending". The process definition file processing unit 302 determines that the Step is different from the Step (FaxNumber) recognized in step S904, and advances the processing to step S912. In step S912, the process definition file processing unit 302 displays a screen 607 in FIG. 9C, inputs the sending job, and sequentially completes processing.

According to the above-described processing in the first exemplary embodiment, when the result of the previous processing is the error, the user can notice the setting value related to the setting which causes the error in the process definition file, and reset the setting value, thus the convenience of the user may be improved.

<Error Case 2>: A case where a previous processing result managed by the job execution history management unit 304 is No. 2 of the table 800

An error in this error case is a use case of an access concentration error of a sending destination server, and the execution result is failure. However, it is not necessary to correct the setting of the cause place. Therefore, although the setting value has no problem, the load of the cooperating server side is increased, and the server cannot be temporarily accessed to fail processing. In such an error case, the server can be correctly accessed when a time elapses.

In step S903, the process definition file processing unit 302 determines the execution result (failure), and advances the processing to step S904. In step S904, the process definition file processing unit 302 recognizes that the previous processing result is an error.

In step S905, the process definition file processing unit 302 specifies a cause place where the Job Type recognized in step S904 matches with the error case from the information of the generation cause place acquired from the error generation cause management unit 303. As a result of specifying the cause place, the process definition file processing unit 302 recognizes that the cause place is an item type (not available).

In step S906, the process definition file processing unit 302 recognizes that the setting value of the changing object does not exist because the setting change object is "not available" from the setting place recognized in step S905, and advances the processing to step S922.

In step S922, the process definition file processing unit 302 sequentially executes processing using the setting content of the recognized process definition file. Therefore, the MFP 102 executes processing related the screens 603 to 607 in FIG. 9C, and displays the top menu 609 in FIG. 9C after completing the execution of the processing.

Figure 13:
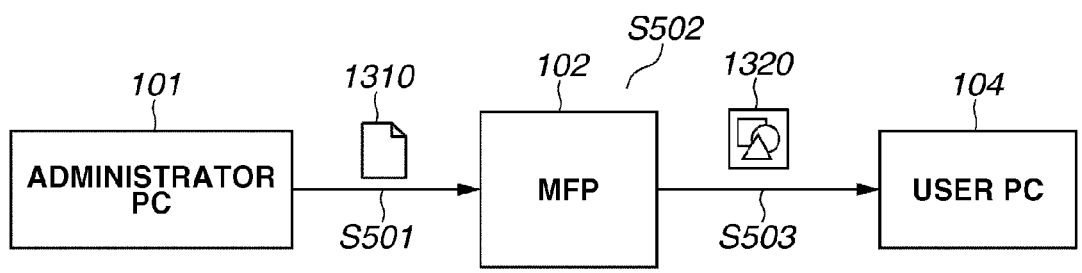
FIG. 13 illustrates an example of an overall operation of an image processing system according to a second exemplary embodiment.

FIG. 13 illustrates an example of an overall operation of an image processing system according to a second exemplary embodiment. A user operates an administrator PC 101 to create a process definition file 1310. Definitions for executing a series of processes utilizing a plurality of functions included in an MFP 102 are described in the process definition file 1310.

According to the present exemplary embodiment, a series of processes for sending image data read by a scanner to a server are defined in the process definition file 1310. Generally, a function for sending data to the server is a function for sending data to a folder shared by a user PC 104 using server message block (SMB) communication.

A user inputs various processing contents (a document scan parameter, a print setting, and the like) via a process definition file creation screen displayed by the administrator PC 101 to create a process definition file. When the creation of the process definition file is completed, the created process definition file 1310 is sent to the MFP 102 from the administrator PC 101 via a LAN 110 in step S501.

The user designates the execution of the process definition file 1310 in the MFP 102. Thus, in step S502, the MFP 102 starts processing according to the process definition file 1310. Then, in step S503, the user operates the MFP 102 according to the processing of the process definition file 510 to send image data 1320 scanned by the MFP 102 to a user PC 104 via the LAN 110.

FIG. 14A illustrates a specific description example of the process definition file 1310 sent to the MFP 102. The example in FIG. 14A is described in the XML format, however the process definition file may be described in other formats.

A tag 601 (Process tag) defines the fact that this file is a process definition file. The respective items relating to the process definition file are described as subelements of the Process tag 601. A process id (1310) uniquely identifying the process definition file, a type (Send) associated with sending, and the name of the process (SEND TO SERVER FOLDER) are defined as attributes of the Process tag 601.

A tag 602 (Workflow tag) defines each processing executed by the process definition file. Each processing is described as a subelement of the Workflow tag 602, and the order of appearance in the process definition file indicates the execution order of the processing.

A tag 603 defines processing for reading scan data as input. The subelement of the tag 603 defines color designation (black and white) of the actually read scan data.

A tag 1401 defines processing for sending image data to the server. The subelement of the tag 1401 divides processing to be input by a user by a type (Step), and is divided with a tag 1402, a tag 1403, a tag 1404, and a tag 1405 for every processing.

The tag 1402 is information for a server environment, and "hidden" of an attribute value info is a fixed value which is not displayed during execution. The subelement defines a domain name (DomainNameServer). Although the fixed value is a value required for executing, this step is not displayed and hidden when the user executes the processing. Such a setting value may cause an error if the setting is changed. The setting value is set by an operator at the time of installation and widely utilized for enabling a stable system operation.

The tag 1403 designates authentication information for login. The subelement defines a user name (userid), a password (password), and a domain name (domain) to which the user belong. The tag 1404 sets a sending destination server. The subelement defines a server name (servername) and a folder name (foldername). The tag 1405 designates the putting of a sending job. The subelement defines sending (background) to the server by a background.

Figure 14B:
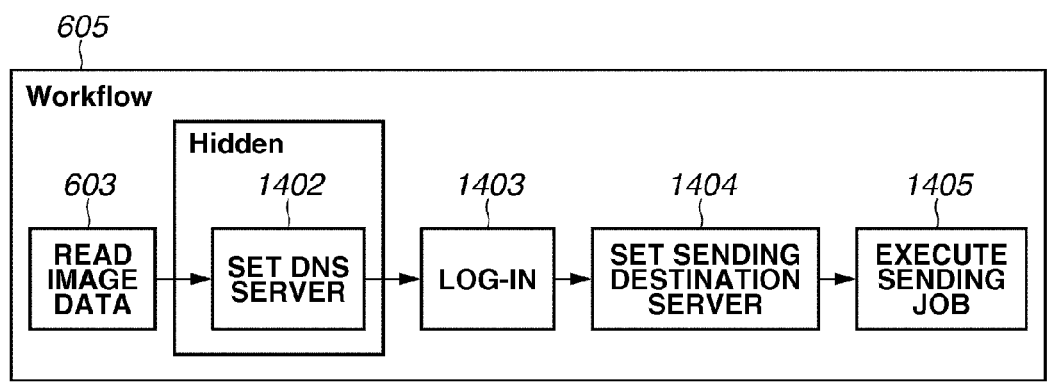
FIG. 14B conceptually represents processing defined by a Workflow tag of the process definition file illustrated in FIG. 14A.

FIG. 14B conceptually represents processing defined by the Workflow tag of the process definition file 1310 illustrated in FIG. 14A. The Workflow tag 602 defines a series of processes of reading the scan data (tag 603), setting Serverinfo (tag 1402), setting the authentication information (tag 1403), and setting the sending destination server (tag 1404). The series of processes includes calling the execution (tag 1405) of the sending job in the end.

Figure 14C:
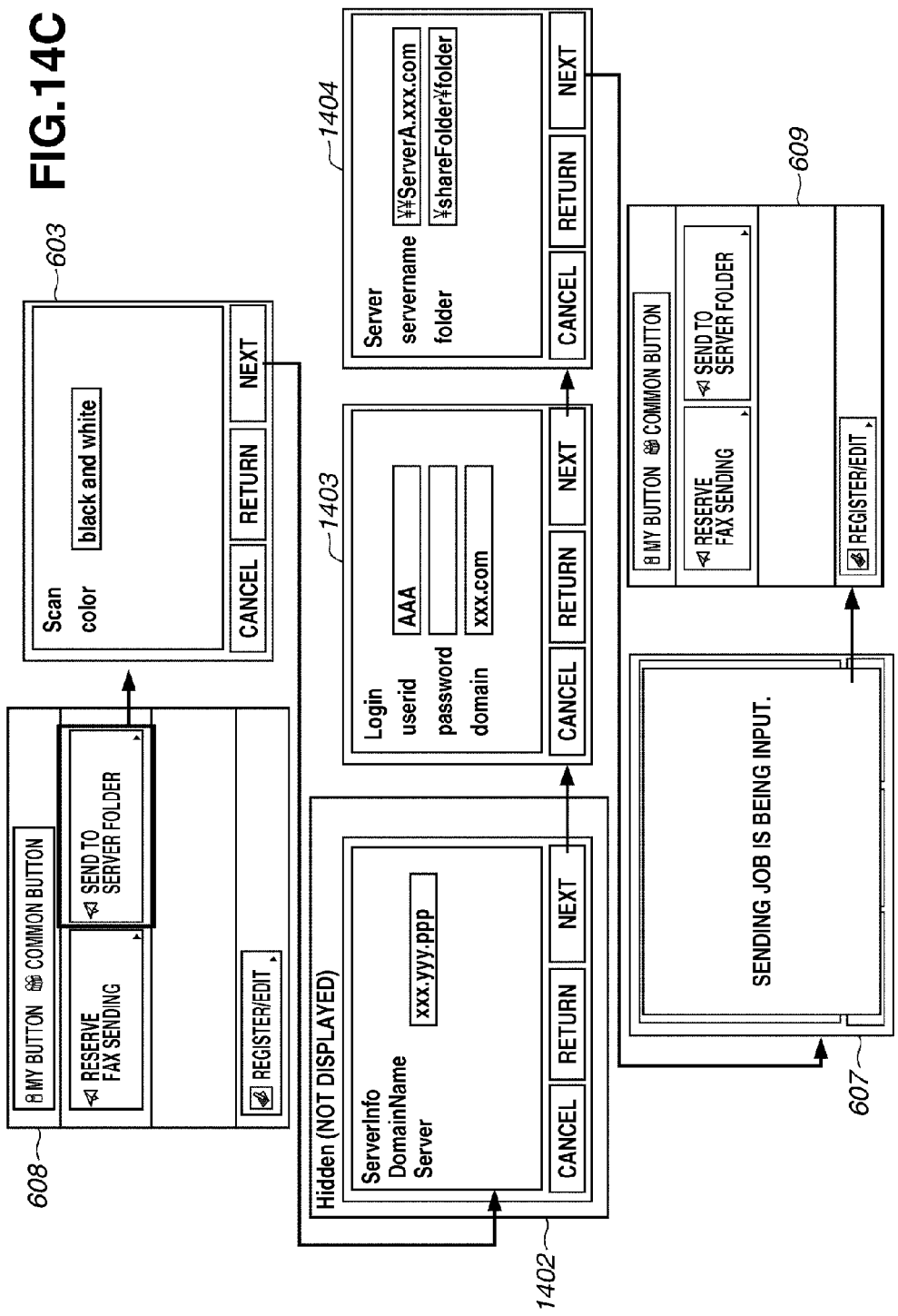
FIG. 14C illustrates an example of a screen displayed as sequential execution processing on an operation unit when the processing defined by the Workflow tag of the process definition file illustrated in FIG. 14A is executed.

FIG. 14C illustrates an example of a screen displayed as sequential execution processing on an operation unit 219 when the processing defined by the Workflow tag of the process definition file 1310 illustrated in FIG. 14A is executed. Top menus 1405 and 1406 displays the process definition file managed by the process definition file processing unit 302 in a list, and allows a user to designate the execution of a specific process definition file. The top menus 1405 and 1406 have the same configuration as those of the top menus 608 and 609.

The user designates the execution of the process definition file of "send to server folder" in the top menu 1405. When the user designates the execution, the MFP 102 executes the setting value associated with scan data reading (tag 603). Then, the MFP 102 sequentially executes processing based on a setting value associated with the Serverinfo (tag 1402), a setting value associated with the Login (tag 1403), and a setting value associated with the Server (tag 1404). When the user presses "next" of the Step (tag 1404) before inputting the sending job, the MFP 102 executes ExecuteSend (tag 1405). After the sending job management unit 310 completes the inputting of the sending job, the top menu 1406 is displayed.

Hereinbelow, there will be described application examples of the present exemplary embodiment when a previous processing result obtained by executing the process definition file of the "send to server folder" is an error, and the user executes the process definition file of the "send to server folder". In the use case described below, it is assumed that a value set in the process definition file is provided in a state where the value is set to the designating unit 305 for resetting operation after error generation.

<Error Case 3>: A case where a previous processing result managed by the job execution history management unit 304 is No. 3 of the table 800

In step S901, the process definition file processing unit 302 recognizes the execution of the "send to server folder". In step S902, the process definition file processing unit 302 acquires all the information pieces of the items corresponding to No. 3 of the table 800, and advances the processing to step S903.

In step S903, the process definition file processing unit 302 determines that the execution result is "failure" (NO in step S903), and advances the processing to step S904. In step S904, the process definition file processing unit 302 recognizes that the previous processing result is an error.

In step S905, the process definition file processing unit 302 specifies a cause place where the Job Type recognized in step S904 matches with the error case from the information of the generation cause place acquired from the error generation cause management unit 303. As a result of specifying the cause place, the process definition file processing unit 302 recognizes that the cause place is any of Item types (userid, password, and domain).

In step S906, the process definition file processing unit 302 determines that a parameter for a changing object exists (YES in step S906), and advances the processing to step S907.

In step S907, the process definition file processing unit 302 starts repeating the loop for the number of the Job Types, and performs processing in the order of the Job Type described in the process definition file of the "send to server folder".

In step S908, if the Job Type is scan, the Job Type is different from the Job Type (SendToServer) recognized in step S904. Thus, the process definition file processing unit 302 advances the processing to step S909. The process definition file processing unit 302 displays a screen 603 in FIG. 14C as the input unit. When the user presses OK, the processing proceeds to loop S907 and the processing is continued.

In step S908, the process definition file processing unit 302 recognizes the Job Type (SendToServer) described in the process definition file of the "send to server folder". The process definition file processing unit 302 determines that the Job Type matches with the Job Type (SendToServer) recognized in step S904, and advances the processing to step S910.

In step S910, the process definition file processing unit 302 starts repeating the loop for the number of Steps, and performs processing in the order of Step described in the process definition file of the "send to server folder".

In step S911, the process definition file processing unit 302 recognizes Step (ServerInfo) described in the process definition file of the "send to server folder". In step S911, the process definition file processing unit 302 determines that the Step is different from the Step (Login) recognized in step S904, and advances the processing to step S912. The process definition file processing unit 302 displays a screen 1402 in FIG. 14C. However, because this step is hidden, and the processing is continued to the loop S907 without displaying the step.

Next, because the three remaining steps associated with the Job Type (SendToServer) exist, the loop processing of step S910 is continued. In step S911, the process definition file processing unit 302 recognizes Step (Login) described in the process definition file of the "send to server folder". In step S911, the process definition file processing unit 302 determines that the Step matches with the Step (Login) recognized in step S904, and advances the processing to step S913.

In step S913, the process definition file processing unit 302 determines that the setting value for input is provided by the value set in the process definition file (NO in step S913), and the processing proceeds to steps S915 and S916.

In step S916, the process definition file processing unit 302 calls the error cause place setting unit 306. FIG. 15 illustrates an example of a screen provided as the input unit for the setting value. With respect to the Step (Login) which causes the error generation, the process definition file processing unit 302 provides the recognized previous processing result, the setting value of the cause, and the inputting field for setting the setting value in which the value set in the process definition file is set. Accordingly, an effect of prompting the user to perform resetting may be obtained.

In step S917, the process definition file processing unit 302 acquires values input into the input fields (userid, password, and domain).

Figure 16:
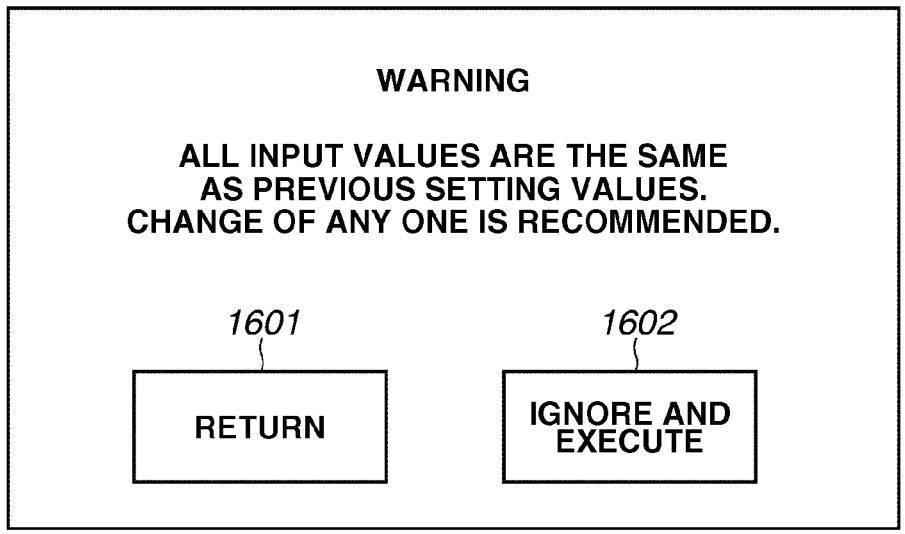
FIG. 16 illustrates an example of a displayed warning screen.

In step S918, the process definition file processing unit 302 calls the error cause place setting result comparison unit 307. The error cause place setting result comparison unit 307 compares the values input into the input fields (userid, password, and domain) with the setting values set in the process definition file. When any one of the plurality of setting values is changed (NO in step S918), the process definition file processing unit 302 advances the processing to step S919. When all the setting values are the same (YES in step S918), the process definition file processing unit 302 advances the processing to step S920, and displays warning. FIG. 16 illustrates an example of a warning screen to be displayed.

In step S919, the process definition file processing unit 302 calls the setting value storage unit 309, rewrites the setting place of the error cause in the process definition file specified by the value set in step S917, and changes the setting value causing the error.

In step S921, the process definition file processing unit 302 determines that the warning is not ignored when the user presses "RETURN" 1601 in step S920 (NO in step S921), and advances the processing to step S916. The process definition file processing unit 302 determines that the warning is ignored when the user presses "IGNORE AND EXECUTE" 1602 in step S920 (YES in step S918), and advances the processing to step S912.

The loop processing of step S910 is continued. In step S911, the process definition file processing unit 302 performs the processing for the remaining two Steps. In the remaining two Steps, the process definition file processing unit 302 recognizes Step (Server) and Step (ExecuteSend) described in the process definition file of the "send to server folder". The process definition file processing unit 302 determines that both the Steps are not the object of the error in step S911, and advances the processing to step S912. In step S912, the process definition file processing unit 302 displays screens 1404 and 607 in FIG. 14C, inputs the sending job, and sequentially completes processing.

<Error Case 4>: A case where a previous processing result managed by the job execution history management unit 304 is No. 4 of the table 800

An error in this error case is a use case of mistaken DomainNameServer (domain name) of the server as a fixed value. Generally, an operation manager previously prepares setting information of the fixed value as a parameter which is not displayed, for every environment. Therefore, a general user may utilize the setting information without being aware of the information in the normal use. By providing the setting information in such a manner, general user's usability during execution may be enhanced. However, a case may occur in which the parameter of the fixed value is to be changed according to an operation status such as setting change of a network environment. In such a case, if a sending error occurs due to the influence of the setting change, the general user may repeat the sending error without noticing the sending error. The application example of the error case 4 is described for a point which is different from the error case 3.

The processing in step S901 is similar to that in the error case 3. In the step S902, the process definition file processing unit 302 acquires all the information pieces of the items corresponding to No. 4 of the table 800, and advances the processing to step S903. The processing in step S903 is similar to that in the error case 3.

In step S905, the process definition file processing unit 302 specifies a cause place where the Job Type recognized in step S904 matches with the error case from the information of the generation cause place acquired from the error generation cause management unit 303. As a result of specifying the cause place, the process definition file processing unit 302 recognizes that the cause place is an Item type (DomainNameServer). The processing in steps S906, S907, S908, and S910 are similar to those in the error case 3.

In step S911, the process definition file processing unit 302 recognizes Step (ServerInfo) described in the process definition file of the "send to server folder". The process definition file processing unit 302 determines that the Step matches with the Step (ServerInfo) recognized in step S904 (YES in step S911), and advances the processing to step S913. The processing in step S913 is similar to that in the error case 3.

Figure 17:
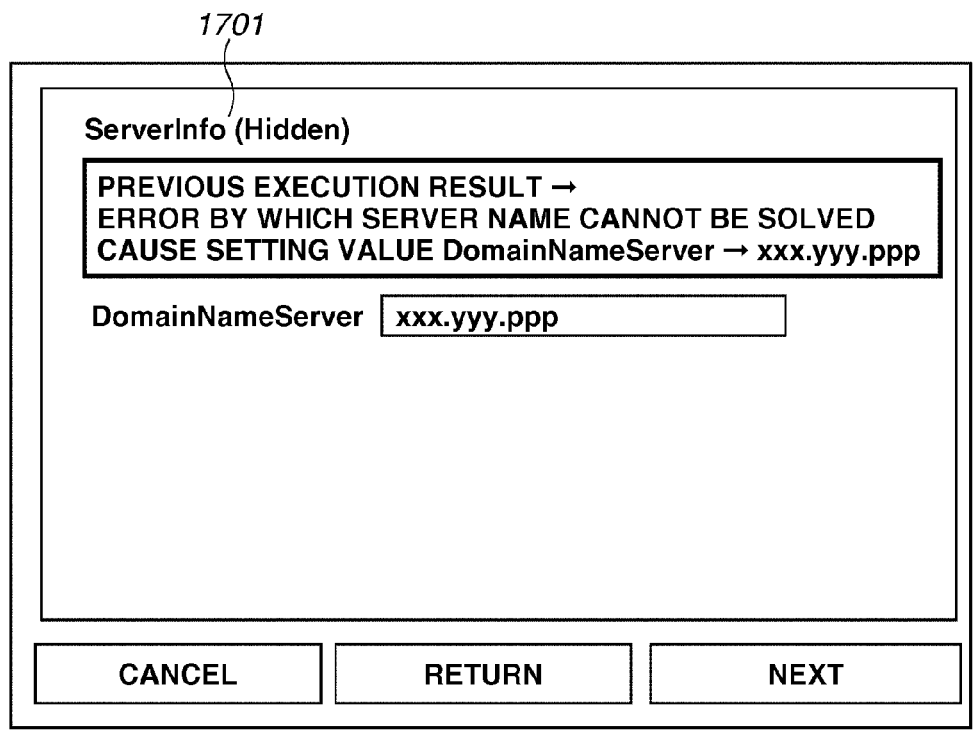
FIG. 17 illustrates an example of a screen to be provided as an input unit for a setting value.

In step S916, the process definition file processing unit 302 calls the error cause place setting unit 306. FIG. 17 illustrates an example of a screen provided as the input unit for the setting value. With respect to the Step (ServerInfo) which causes the error generation, the process definition file processing unit 302 provides the recognized previous processing result, the setting value of the cause, and the inputting field for setting the setting value in which the value set in the process definition file is set. Accordingly, an effect of prompting the user to perform resetting may be obtained. In addition, the process definition file processing unit 302 designates the error cause place setting unit 306 so as not to display (Hidden) 1701 in order to indicate that this step is not usually displayed.

In step S917, the process definition file processing unit 302 acquires a value input into the input field (Domain-NameServer).

In step S918, the process definition file processing unit 302 calls the error cause place setting result comparison unit 307. The error cause place setting result comparison unit 307 compares the value input into the input field (Domain-NameServer) with the setting value set in the process definition file, and checks whether the setting value is changed. If the input value is changed (NO in step S918), the process definition file processing unit 302 advances the processing to step S919. If the input value is the same (YES in step S918), the process definition file processing unit 302 advances the processing to step S920, and displays the warning screen 1200.

In step S919, the process definition file processing unit 302 calls the setting value storage unit 309, rewrites the setting place of the error cause in the process definition file specified by the value set in step S917, and changes the setting value causing the error.

In step S921, the process definition file processing unit 302 determines that the warning is not ignored when the user presses "RETURN" in step S920 (NO in step S921), and advances the processing to step S916.

The loop processing of step S910 is continued. In step S911, the process definition file processing unit 302 performs processing for the remaining three Steps. In the remaining three Steps, the process definition file processing unit 302 recognizes Step (Login), Step (Server), and Step (Execute-Send) described in the process definition file of the "send to server folder". The process definition file processing unit 302 determines that all the Steps are not the object of the error in step S911, and advances the processing to step S912. In step S912, the process definition file processing unit 302 displays the screens 1403, 1404, and 607 in FIG. 14C, inputs the sending job, and sequentially completes processing.

According to the above-described processing in the second exemplary embodiment, when the previous processing is the error, the user can reset a place related to the place of which setting value in the process definition file is the cause of error, thus the convenience of the user may be improved.

As described above, if the result of the previous processing is the error, the error generation cause place is specified and notified to a user who executes the process definition file, so that the user can notice the error generation cause place. Thus, the user can correct the specified cause place and execute the process definition file.

Aspects of the present invention can also be realized by a computer of a system or apparatus (or devices such as a CPU or an MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-286087 filed Dec. 27, 2011, which is hereby incorporated by reference herein in its entirety.

What is claimed is:

1. An image forming apparatus having a plurality of functions, the image forming apparatus comprising:
a first display control unit configured to perform display control of buttons each corresponding to a different one of process definition files on an operation unit of the image forming apparatus, wherein the process definition file defines a series of processes utilizing the plurality of functions and an order of the series of processes;
a processing execution unit configured to execute, when a user presses a button from the buttons, a series of processes defined in a process definition file corresponding to the pressed button based on a plurality of setting values input by the user via the operation unit after pressing the button;
a history storage unit configured to store, as a history, an execution result of the processing by the processing execution unit, the plurality of setting values, and an error content in a case where the execution result is failure;
a determination unit configured to determine whether the execution result of a previous processing is successful based on the stored history in a case where the processing execution unit re-executes the processing; and
a second display control unit configured to specify a setting value potentially causing the failure based on the error content in a case where the determination unit determines that the execution result of the previous processing is failure and to perform display control of a setting field for setting the setting value.

2. The image forming apparatus according to claim 1, wherein the second display control unit is further configured to control displaying the error content and the setting value near the setting field for setting the setting value potentially causing the failure.

3. The image forming apparatus according to claim 1, wherein the second display control unit clears the setting field for setting the setting value potentially causing the failure, and is further configured to control displaying a warning in a case where a setting value set in the cleared setting field is the same as the setting value causing the failure.

4. The image forming apparatus according to claim 1, wherein the second display control unit displays the setting value in the setting field for setting the setting value potentially causing the failure, and is further configured to control displaying a warning in a case where a setting value newly set in the setting field is the same as the displayed setting value.

5. The image forming apparatus according to claim 1, wherein in a case where a plurality of setting values potentially causing the failure exist, the second display control unit is configured to control displaying a warning message in a case where all setting values set in setting fields for setting the setting values are the same as the setting values causing the failure.

6. A method for information processing executed by an image forming apparatus having a plurality of functions, the method comprising:

performing first display control of buttons each corresponding to a different one of process definition files on an operation unit of the image forming apparatus, wherein the process definition file defines a series of processes utilizing the plurality of functions and an order of the series of processes;

executing, when a user presses a button from the buttons, a series of processes defined in a process definition file corresponding to the pressed button based on a plurality of setting values input by the user via the operation unit after pressing the button;

storing, as a history, an execution result of the processing, the plurality of setting values, and an error content in a case where the execution result is failure;

determining whether the execution result of a previous processing is successful based on the stored history in a case of re-executing the processing; and specifying a setting value potentially causing the failure based on the error content in a case where the execution result of the previous processing is determined as failure and performing second display control of a setting field for setting the setting value.

7. A non-transitory computer-readable storage medium storing a program for causing a computer having a plurality of functions to execute method comprising:

performing first display control of buttons each corresponding to a different one of process definition files on an operation unit of the image forming apparatus, wherein the process definition file defines a series of processes utilizing the plurality of functions and an order of the series of processes;

executing, when a user presses a button from the buttons, a series of processes defined in a process definition file corresponding to the pressed button based on a plurality of setting values input by the user via the operation unit after pressing the button;

storing, as a history, an execution result of the processing, the plurality of setting values, and an error content in the case where the execution result is failure;

determining whether the execution result of a previous processing is successful based on the stored history in a case of re-executing the processing; and specifying a setting value potentially causing the failure based on the error content in a case where the execution result of the previous processing is determined as failure and performing second display control of a setting field for setting the setting value.

* * * * *